(12) United States Patent
Downey (10) Patent No.: US 7,866,751 B2
(45) Date of Patent: Jan. 11, 2011

(54) APPARATUS AND METHODS TO INTEGRALLY FORM LEVER OPERATED CABLES WITH VEHICLE SEATS

(75) Inventor: Kevin Downey, Grand Rapids, MI (US)

(73) Assignee: Brunswick Corporation, Lake Forest, IL (US)

( * ) Notice: Subject to any disclaimer, the term of this patent is extended or adjusted under 35 U.S.C. 154(b) by 224 days.

(21) Appl. No.: 11/866,328

(22) Filed: Oct. 2, 2007

(65) Prior Publication Data

US 2009/0085367 A1  Apr. 2, 2009

(51) Int. Cl.
*A47C 1/00* (2006.01)

(52) U.S. Cl. .............................. 297/344.24; 297/344.1; 297/344.21

(58) Field of Classification Search ............ 297/344.24, 297/344.22, 344.21, 344.11, 452.19, DIG. 2, 297/463.2, 311, 337, 344.1, 344.13, 344.26, 297/451.13, 452.65, 463.1, 85 C
See application file for complete search history.

(56) References Cited

U.S. PATENT DOCUMENTS

| | | | | |
|---|---|---|---|---|
| 4,671,572 | A * | 6/1987 | Young et al. ............ | 297/344.24 |
| 4,884,543 | A | 12/1989 | Stutzenberger | |
| 5,056,862 | A * | 10/1991 | May et al. ................. | 297/85 C |
| 5,082,328 | A | 1/1992 | Garelick | |
| 5,161,765 | A | 11/1992 | Wilson | |
| 5,277,080 | A * | 1/1994 | Roelle .................... | 74/501.5 R |
| 5,497,676 | A * | 3/1996 | Barnard .................. | 74/501.5 R |
| 5,673,972 | A * | 10/1997 | Dudash et al. ......... | 297/378.12 |
| 5,813,726 | A | 9/1998 | Husted | |
| 5,879,043 | A * | 3/1999 | Radue et al. ............. | 296/65.17 |
| 5,882,076 | A | 3/1999 | Garelick et al. | |
| 5,884,887 | A | 3/1999 | Garelick et al. | |
| 6,877,811 | B1 * | 4/2005 | Garelick ................. | 297/344.22 |
| 6,938,957 | B2 * | 9/2005 | Beatty et al. ........... | 297/344.22 |
| 7,025,419 | B2 | 4/2006 | Sasaki et al. | |
| 7,172,250 | B2 * | 2/2007 | Wu ......................... | 297/344.1 |
| 7,198,329 | B1 * | 4/2007 | Larson ................... | 297/344.18 |
| 7,303,236 | B2 | 12/2007 | Ritter et al. | |
| 7,347,499 | B2 * | 3/2008 | Slabaugh et al. ....... | 297/452.56 |
| 7,451,958 | B2 * | 11/2008 | Ritter et al. .................. | 248/415 |
| 2002/0175549 | A1 * | 11/2002 | Hamilton et al. ............ | 297/383 |
| 2003/0057755 | A1 * | 3/2003 | Brandt et al. .......... | 297/344.24 |
| 2003/0062759 | A1 * | 4/2003 | Gupta et al. ........... | 297/452.65 |
| 2003/0189370 | A1 * | 10/2003 | Hemmer et al. ........ | 297/344.11 |
| 2003/0218370 | A1 * | 11/2003 | Langham ................ | 297/344.22 |
| 2006/0144315 | A1 | 7/2006 | Garelick | |
| 2006/0197365 | A1 * | 9/2006 | Ritter et al. ............ | 297/344.11 |
| 2007/0029855 | A1 | 2/2007 | Ritter et al. | |
| 2007/0046091 | A1 * | 3/2007 | Day et al. .............. | 297/378.12 |
| 2007/0182229 | A1 * | 8/2007 | Maebert et al. .......... | 297/361.1 |

* cited by examiner

*Primary Examiner*—Milton Nelson, Jr.
(74) *Attorney, Agent, or Firm*—Hanley, Flight & Zimmerman, LLC (57) ABSTRACT

Apparatus and methods to integrally form lever operated cables with vehicle seats are described. An example apparatus includes a channel integrally formed in a portion of a vehicle seat and a seat position control integrally coupled to the vehicle seat. A cable assembly slidably movable within the channel and has a first end operatively coupled to a seat position adjustment mechanism and a second end operatively coupled to the seat position control.

20 Claims, 8 Drawing Sheets

APPARATUS AND METHODS TO INTEGRALLY FORM LEVER OPERATED CABLES WITH VEHICLE SEATS

FIELD OF THE DISCLOSURE

The present disclosure relates generally to vehicle seats and, more particularly, to apparatus and methods to integrally form lever operated cables with vehicle seats.

BACKGROUND

Many vehicle seats such as those used in automobiles, boats, industrial or commercial vehicles, etc. include a seat slider mechanism that enables a seat occupant to adjust the seat to a desired position along generally a fore/aft axis or direction. Additionally or alternatively, many vehicle seats such as those used in boats can include a seat rotation mechanism that enables a seat occupant to rotate the seat to a desired rotational position. The rotational and fore/aft adjustments of the vehicle seat enables, for example, an operator (e.g., a driver) to adjust the position of the seat for ease of use of vehicle controls, comfort, safety, etc.

Typically, seat slider and/or rotation mechanisms are operated via a lever, knob, or other mechanical member that is directly and rigidly coupled to the mechanisms and located in close proximity to the mechanisms (e.g., at a bottom surface of the vehicle seat). However, in some cases, a vehicle operator may have difficulty actuating the lever, knob, or other mechanical member. For example, some vehicle seat pedestals or mounting posts are relatively short (e.g., less than eight inches) resulting in a relatively small vertical distance or space between the seat bottom and the surface of the vehicle to which the pedestal is mounted (e.g., a deck of a boat). Short pedestals or mounting posts typically require a short lever to operate a seat rotation mechanism and/or a seat slider mechanism. However, short levers are typically disposed substantially inward from the edge of the seat bottom so that the lever can have a full range of motion to actuate and operate, thereby making it more difficult for the seat occupant to reach and operate the lever. In particular, a longer lever near the outer edge of the seat bottom is easier for a seat occupant to reach and operate. However, a longer lever requires more vertical space in which to actuate and travel.

A flexible coupling member such as, for example, a cable assembly or the like can be used to operate a lever or other mechanical member. A cable assembly requires substantially minimal or negligible vertical distance or space between a seat bottom and a mounting surface, thereby substantially reducing the space required to operate the lever. Thus, a cable operated lever can be positioned or placed near the bottom edge of the seat to greatly facilitate actuation and operation of a seat slider mechanism and/or a seat rotation mechanism by making it easier for a seat occupant to reach and/or operate the lever.

However, such a flexible coupling or cable assembly is typically exposed and can hang down or droop from the bottom of a vehicle seat. The exposed cable is unsightly and could be caught on items (e.g., a screw, etc.) near the bottom of the vehicle seat or vehicle mounting surface and/or an operator or other occupant of the boat during actuation, causing damage to the cable and/or causing the lever to function improperly.

DETAILED DESCRIPTION

In general, the example apparatus and methods to integrally form lever operated cables with vehicle seats described herein involve a seat position operating or control apparatus such as, for example, an operating lever, control lever, knob, or other control apparatus integrally formed or coupled to a portion of a vehicle seat so that the seat position control apparatus is easily and conveniently accessible to an occupant of the seat. For example, the seat position control apparatus may be positioned on an arm rest and/or a side surface of the vehicle seat. The seat position control apparatus may be operatively coupled to a seat position adjustment mechanism via a flexible coupling such as, for example, a cable assembly or the like so that operation of the seat position control apparatus by an occupant of the vehicle seat can unlock/lock the seat position adjustment mechanism to adjust a position (e.g., a rotational position, a fore/aft position, etc.) of the vehicle seat.

In addition, the flexible coupling is substantially concealed within the vehicle seat and hidden from view. Substantially concealing the flexible coupling can prevent an operator of the vehicle seat, exposed items (e.g., a screw, etc.), or other items or objects from interfering with or causing damage to the flexible coupling and/or impairing operation of the lever. In one described implementation, the example seat position control apparatus includes dual actuators or levers operatively coupled to a seat rotation mechanism and a seat slider mechanism. In this manner, a seat occupant can adjust, for example, the rotational position and the fore and aft position of the vehicle seat via a single seat position control apparatus that is easily and conveniently accessible to the operator or occupant of the vehicle seat.

Figure 1A:
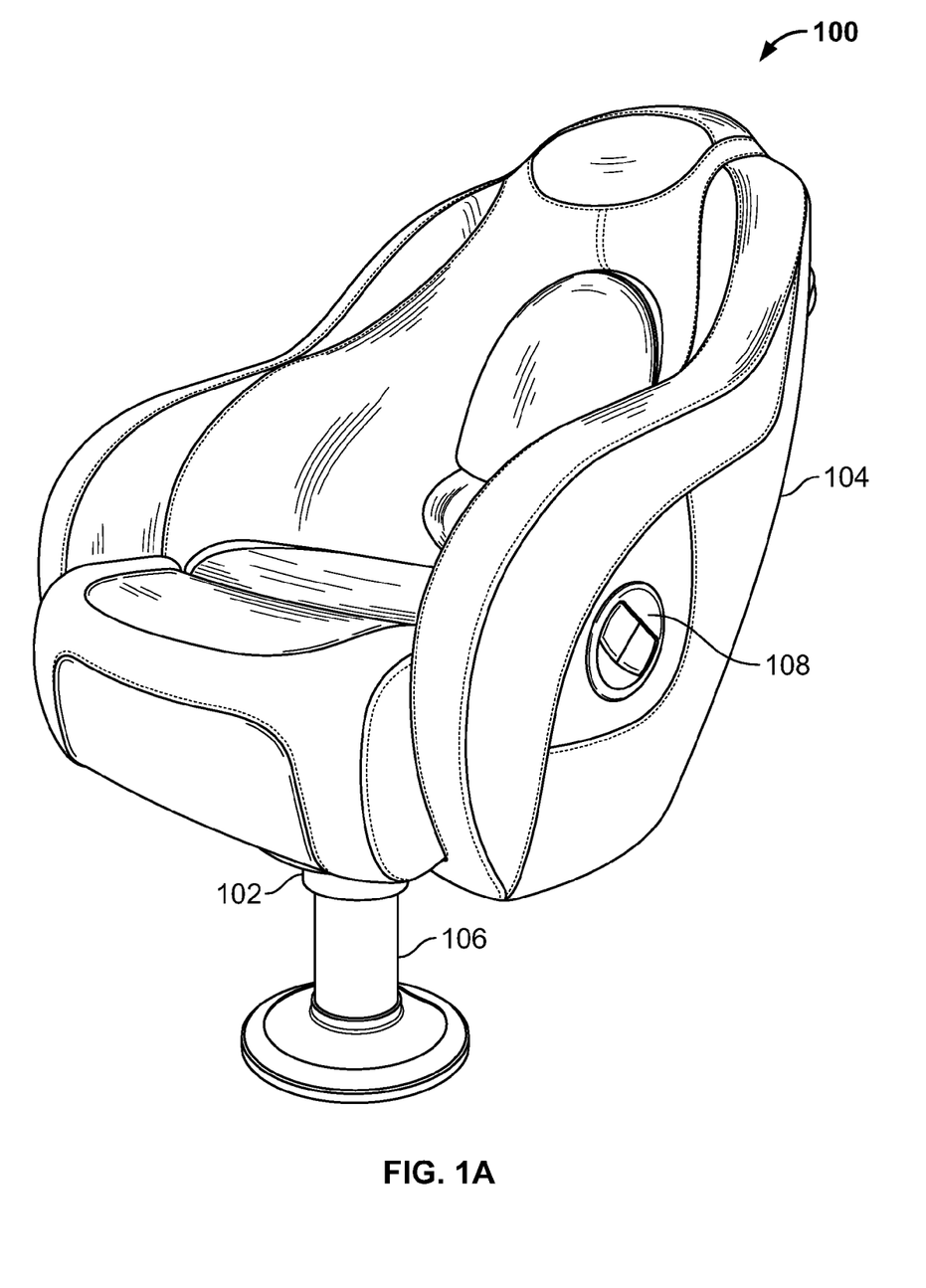
FIG. 1A depicts an example vehicle seat that uses the example lever operated cables described herein.
Figure 1B:
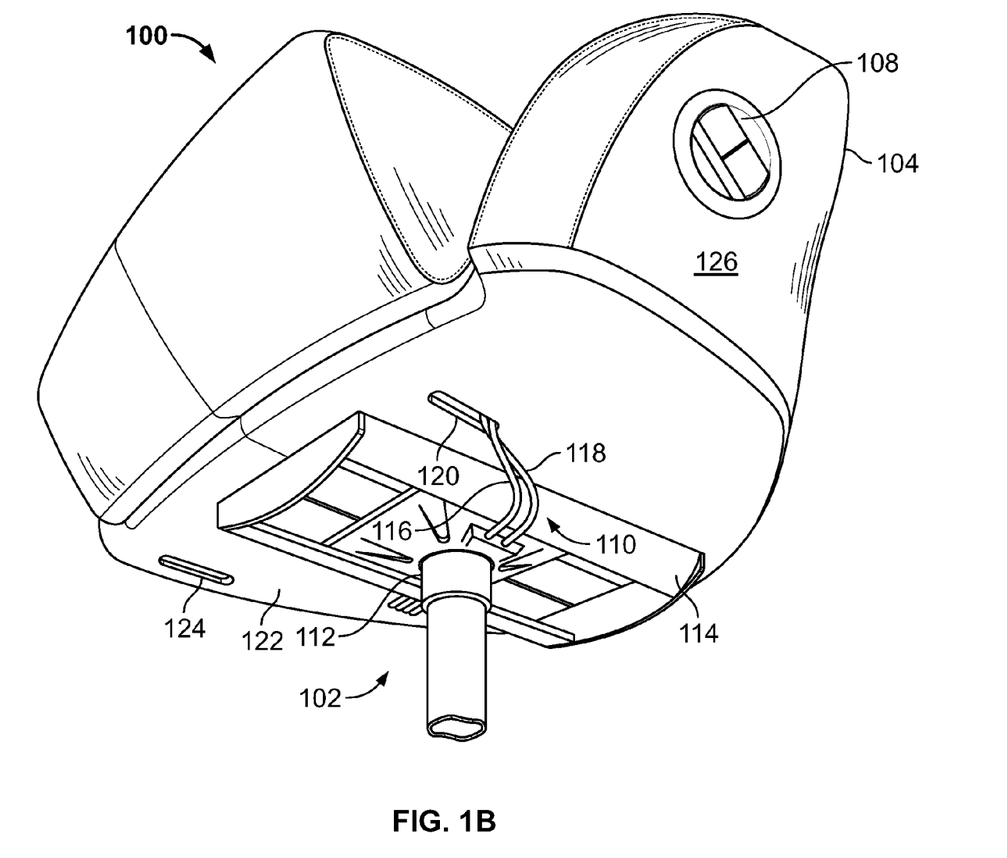
FIG. 1B is a bottom view of the example vehicle seat of FIG. 1A.

FIG. 1A illustrates an example vehicle seat 100 that uses the example lever operated cables described herein. In the illustrated example, the example vehicle seat 100 includes a seat position adjustment mechanism 102 configured to receive a seating member or seat portion 104. The adjustment mechanism 102 is coupled to a mounting base or pedestal 106, which may be coupled or fixed to a floor surface of a vehicle such as, for example, a boat deck. As described in greater detail below, the seating member 104 includes a seat position control apparatus 108 that is operatively coupled to the seat position adjustment mechanism 102 via a flexible coupling 110 (FIG. 1B). A substantial portion of the flexible coupling 110 is hidden or concealed within the seating member 104 and can slidably move therein. Actuating the seat position control 108 enables operation of the adjustment mechanism 102 such as, for example, a seat rotation mechanism to enable the seating member 104 to rotate relative to the base or pedestal 106.

FIG. 1B depicts a bottom view of the vehicle seat 100 of FIG. 1A. As shown in FIG. 1B, the flexible coupling 110 is operatively coupled to the seat position adjustment mechanism 102. The adjustment mechanism 102 can include a first adjustment mechanism 112 (e.g., a seat rotation mechanism) and a second adjustment mechanism 114 (e.g., a seat slider mechanism). Each of the first and the second adjustment mechanisms 112 and 114 can be operatively coupled to a seat position control member or device (e.g., the seat position control apparatus 108) via a flexible coupling apparatus such as, for example, the flexible coupling 110. In the illustrated example, a first flexible coupling 116 is operatively coupled to the first adjustment mechanism 112 and a second flexible coupling 118 is operatively coupled to the second adjustment mechanism 114.

The flexible couplings 116 and 118 are routed within the seating member 104 via an aperture or opening 120 on a bottom surface 122 of the seating member 104. An additional aperture or opening 124 may be included on the bottom 122 surface opposite the aperture or opening 120 to accommodate example implementations of the vehicle seat 100 that include a plurality of seat position controls 108 such as, for example, a first seat position control 108 coupled to a first side surface 126 of the seating member 104 and a second seat position control (similar to the first seat position control 108) coupled to a second side surface (not shown) of the seating member 104 opposite the first side surface 126.

Figure 2A:
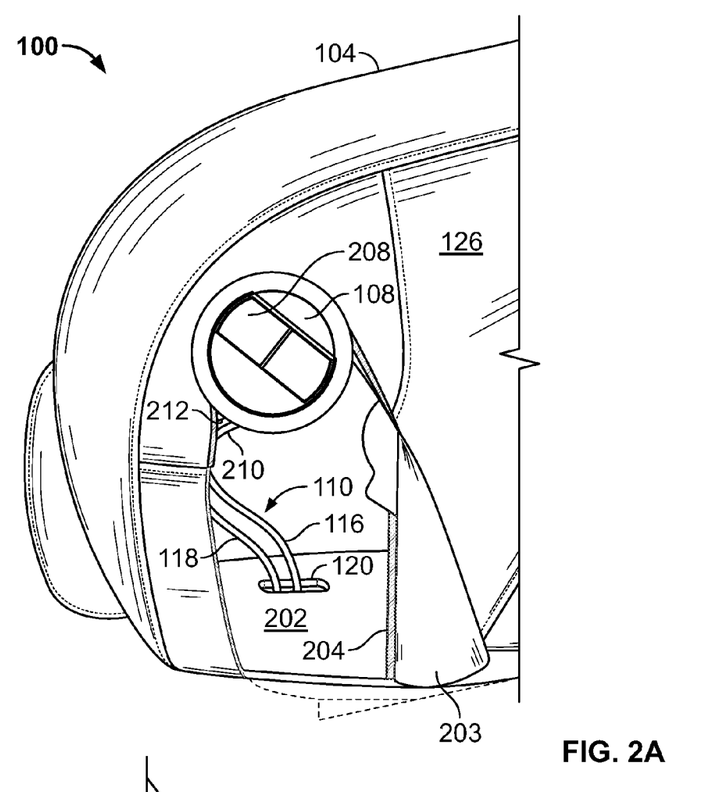
FIG. 2A is a partial cutaway side view of the example vehicle seat of FIG. 1A.

FIG. 2A illustrates a partial cutaway side view of the vehicle seat 100. In the example illustration, a flexible coupling (e.g., the flexible coupling 110) can be hidden or concealed within the seating member 104 and operatively coupled to the seat position control apparatus 108. The flexible coupling 110 can be positioned or routed within a channel or path 202 of the seating member 104 via the opening 120 such that the flexible coupling 110 is substantially hidden or concealed and can slidably move within the seating member 104. The seating member 104 may include a frame 204, a foam or cushion center (not shown), and an upholstered outer surface 203. The frame 204 of the seating member 104 can be formed as a shell-like wall structure and can be made of plastic or any other suitable material formed via roto-molding, blow molding, injection molding, or any other suitable process(es). In other example implementations, the frame 204 can be formed as a solid structure via injection molding or any other suitable process(es). The upholstered outer surface 203 can be made of vinyl material, mesh material, and/or any other suitable materials.

Referring to FIG. 2A, the flexible couplings 116 and 118 are routed within the channel or path 202 of the seating member 104 via the opening 120 and operatively coupled to the seat position control 108. The seat position control 108 can be integrally formed or coupled to the side surface 126 of the seating member 104 (e.g., via fasteners, a press fit, etc). Although the illustrated example depicts the seat position control 108 as the only control that is operatively coupled to the adjustment mechanism 102 (FIG. 1B), in other example implementations, the seating member 104 can include a plurality of controls similar to the seat position control 108 coupled thereto to operate respective adjustment mechanisms. For example, a first side surface of the seating member 104 can include a first seat position control to operate the first adjustment mechanism 112 (FIG. 1B) and a top surface or arm rest of the seating member 104 can include a second seat position control to operate the second adjustment mechanism 114 (FIG. 1B).

The seat position control 108 may include a single actuator or lever or may include a plurality of actuators or levers to operate respective adjustment mechanisms. However, in other example implementations, any other suitable structure such as, for example, a rotatable knob or pull knob etc. may be used instead of levers.

In the illustrated example of FIG. 2A, the seat position control 108 includes a first actuator or lever 206 and a second actuator or lever 208 operatively coupled to respective adjustment mechanisms such as, for example, the first and the second adjustment mechanisms 112 and 114. As shown in the illustration, the first lever 206 is operatively coupled to a first end 210 of the first flexible coupling 116 and the second lever 208 is operatively coupled to a first end 212 of the second flexible coupling 118.

Figure 2B:
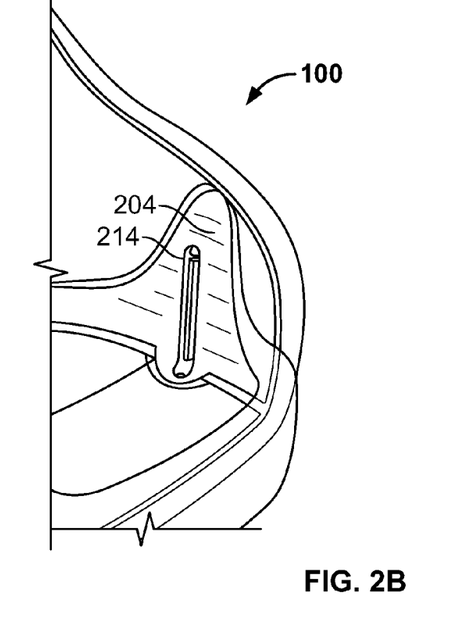
FIG. 2B is a partial cutaway side view of the example vehicle seat of FIG. 1A illustrating another manner in which the flexible coupling can be hidden or concealed within the vehicle seat of FIG. 1A.
Figure 2C:
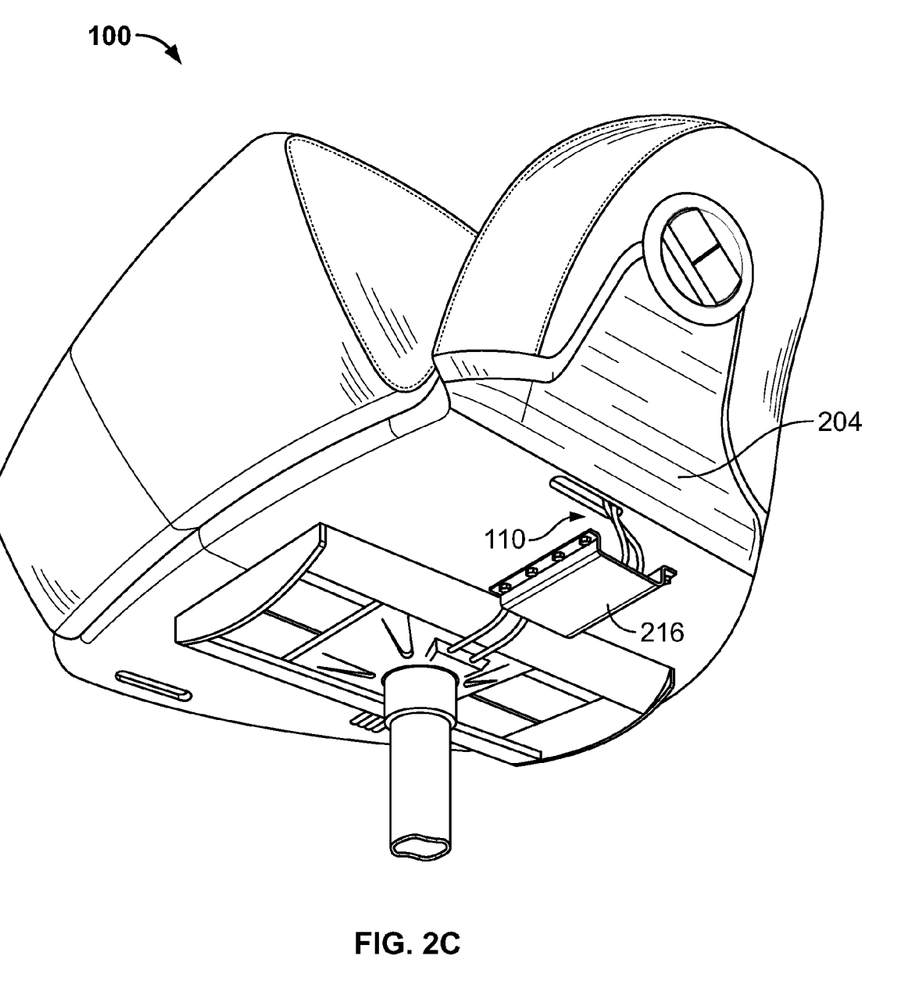
FIG. 2C is a partial cutaway side view of the example vehicle seat of FIG. 1A illustrating yet another manner in which the flexible coupling can be hidden or concealed within the vehicle seat of FIG. 1A.
Figure 2D:
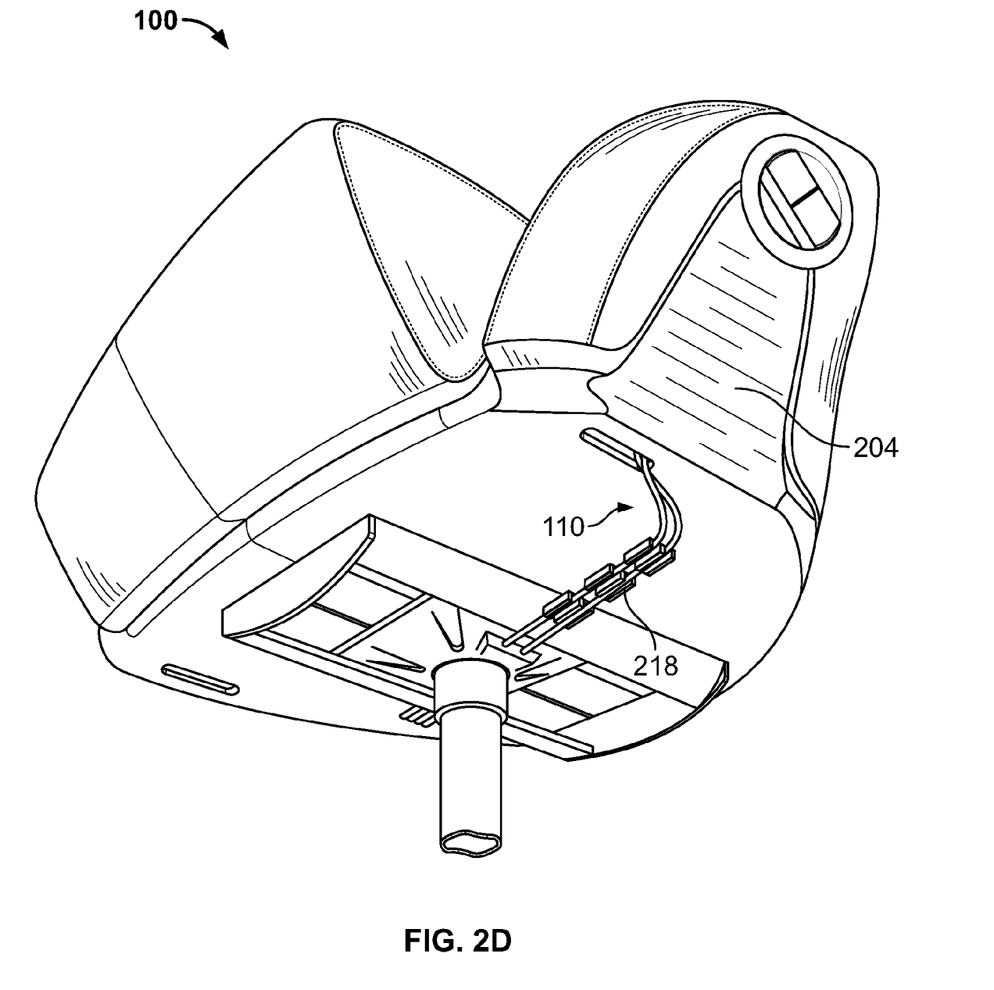
FIG. 2D is a partial cutaway side view of the example vehicle seat of FIG. 1A illustrating yet another manner in which the flexible coupling can be hidden or concealed within the vehicle seat of FIG. 1A.

FIGS. 2B-2D illustrate other example implementations in which the flexible coupling can be substantially concealed or hidden within the vehicle seat 100. FIG. 2B illustrates an example implementation in which the flexible coupling 110 can be placed or routed within a groove 214 integrally formed (e.g., via roto-molding, injection molding, etc.) with the frame 204. In yet other example implementations as illustrated by way of example in FIG. 2C, the flexible coupling 110 can be routed via a track or a tubular member 216. The track or tubular member 216 can be a substantially unitary or single piece structure or can be a plurality of track or tubular members. In yet other example implementations as illustrated by way of example in FIG. 2D, the flexible coupling 110 can be fastened to a frame of the vehicle seat via fasteners 218 such as, for example, clips, U-shaped pins, etc.

Figure 3:
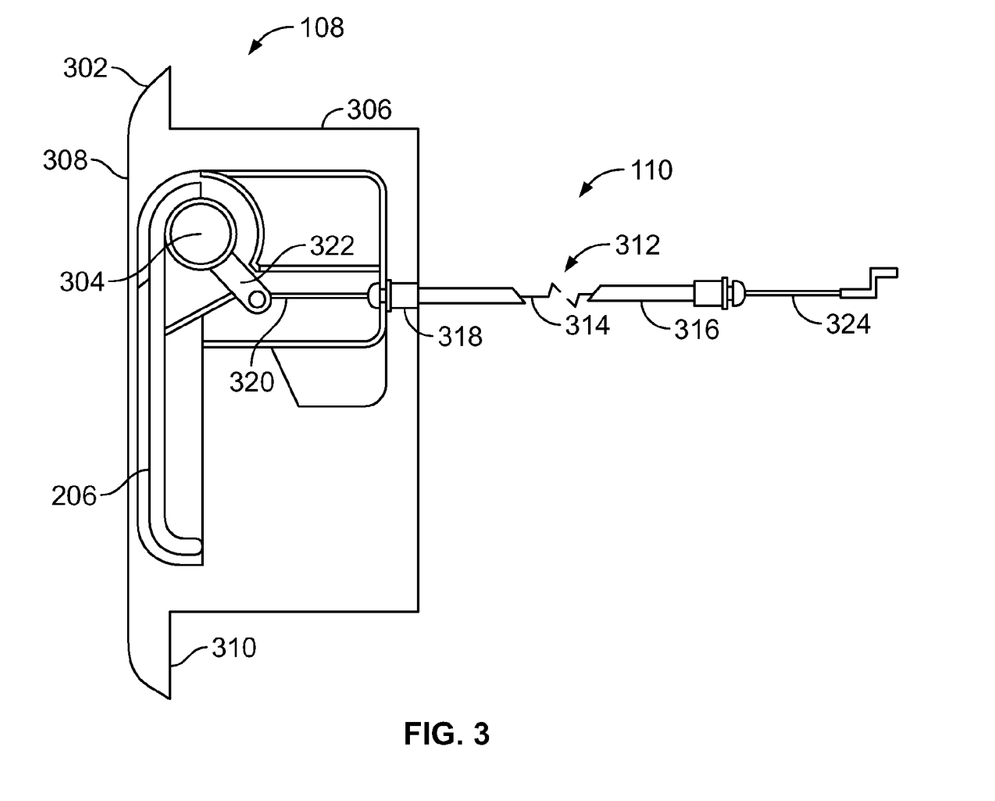
FIG. 3 is a cross-sectional view illustrating one manner in which the lever of FIG. 1A may be operatively coupled to a cable.

FIG. 3 is a cross-sectional view illustrating in more detail one manner in which the seat position control 108 may be operatively connected to the flexible coupling 110. A lever (e.g., the lever 206 of FIG. 2A) of the seat position control 108 is pivotally mounted to a body or housing 302 and can rotate about a pivot 304. The housing 302 has a cylindrical portion 306 that is press fit into an opening or aperture (not shown) of the seating member 104 that is sized to receive the housing 302. The housing 302 also includes a face 308 forming a shoulder 310 that engages a side surface (e.g., the side surface 126) of the seating member 104. In other example implementations, the housing 302 may include a mounting aperture or flange to couple or mount the seat position control 108 to a frame (e.g., the frame 204 of FIG. 2A) of the seating surface 104 via mechanical fasteners, clips, chemical fasteners, etc.

The example of FIG. 3 depicts the flexible coupling 110 as a cable assembly 312, which includes a cable 314 covered by an outer sheath 316. The outer sheath 316 surrounds at least a portion of a length of the cable 314 so that the cable 314 can slidably move within the sheath 316. The outer sheath 316 is coupled to the housing 302 via a cable-mount connector 318 (e.g., a ferrel). A first end 320 of the cable 314 is operatively coupled to an extension 322 of the lever 206 and a second end 324 of the cable 314 is operatively coupled to the adjustment mechanism 102.

Figure 4:
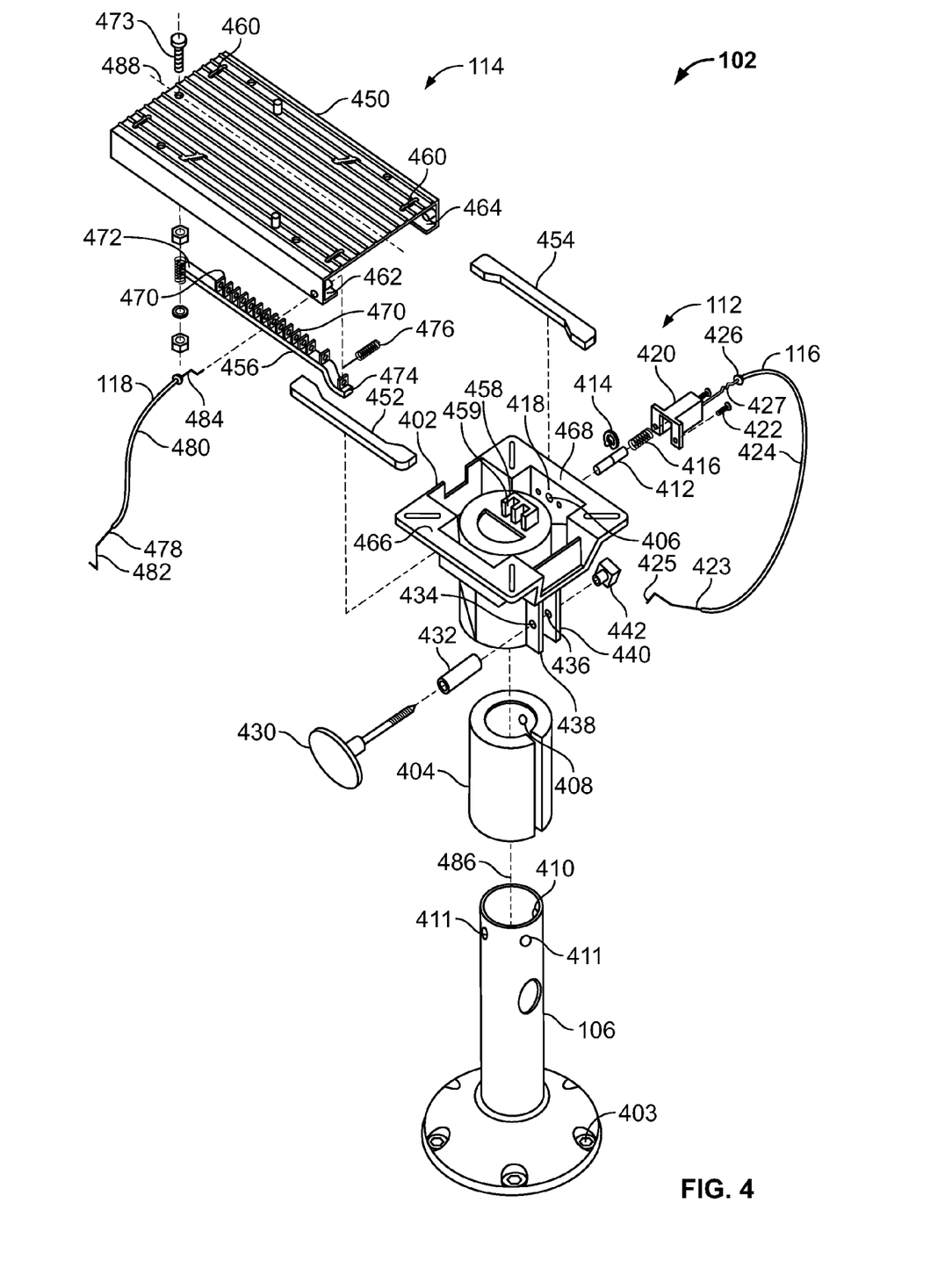
FIG. 4 illustrates an exploded view of an example adjustment mechanism that may be used to implement the example vehicle seat of FIG. 1A.

FIG. 4 illustrates an exploded view of the example seat position adjustment mechanism 102 that may be used to implement the example vehicle seat 100 of FIG. 1A. As described above, the adjustment mechanism 102 can include the first adjustment mechanism 112 and the second adjustment mechanism 114. In the illustrated example, the first adjustment mechanism 112 is a seat rotation mechanism and the second adjustment mechanism 114 is a seat slider mechanism. However, in other example implementations, the seat position adjustment mechanism 102 can be configured to include a seat slider mechanism, a seat rotation mechanism, and/or any other adjustment mechanisms (e.g., an adjustment mechanism to adjust the tilt and/or height position of a vehicle seat).

In the illustrated example, the seat rotation mechanism 112 includes a seat mount 402 configured to rotatably couple the seating member 104 to the base or pedestal 106 via a bushing 404. The pedestal 106 includes mounting holes 403 for mounting the pedestal 106 and, thus, the seat mount 402, to a floor surface of a vehicle (e.g., a boat deck surface) via screws (not shown) or any other suitable fastening mechanisms that pass into and/or through the mounting holes 403. The seat mount 402 can be made from various materials such as aluminum, steel, plastic, and/or any other suitable material and via any process(es) such as, for example, stamping and/or punching operations.

The seat mount 402, the bushing 404, and the pedestal 106 include respective openings or apertures 406, 408, and 410 that are configured to align to receive a locking pin 412. In some example implementations, the pedestal 106 can include a plurality of openings or apertures 411 in which the locking pin 412 may engage to lock the seating member 104 at various rotational or angular positions relative to, for example, a forward facing orientation. Coupled to the locking pin 412 is a spring retainer 414, such as an "E" clip spring retainer, which captures or holds a spring 416 between the spring retainer 414 and an inner surface 418 of the seat mount 402. In other example implementations, the spring retainer 414 could be implemented using any other suitable retaining mechanism such as a circlip, lock washer, push nut, etc. An adaptor housing 420 is coupled to the seat mount 402 via screws 422 or any other suitable fastening mechanism and houses the first flexible coupling 116.

The first flexible coupling 116 is a cable assembly substantially similar to the cable assembly 312 of FIG. 3 having a cable 423 and an outer sheath 424. The cable has a first end 425 that is operatively coupled to the lever 206 (FIG. 2A) in a manner substantially similar to that shown in FIG. 3, and a second end 427 that is operatively coupled to the locking pin 412 via a cable-to-lock pin adaptor 426.

As illustrated in FIG. 4, the example rotational mechanism 112 may include a frictional control knob 430 to increase or decrease the friction between the seat mount 402 and the bushing 404 to control the ease with which the seat mount 402 can rotate relative to the pedestal 106. The control knob 430 is threaded through a spacer 432 and through holes 434 and 436 in flanges 438 and 440 of the seat mount 402 and is secured with a friction control nut 442.

The slider mechanism 114 in the illustrated example includes a slider plate 450, slider guides or guide members 452 and 454, a locking member 456 and a locking lug 458 that can be fixed to (e.g., integrally formed with) a seat mount such as, for example, the seat mount 402. The slider plate 450 includes a plurality of mounting holes 460 to which a seating member (e.g., the seating member 104 of FIG. 1) can be mounted via screws or any other suitable fastening mechanism that passes into and/or through the mounting holes 460.

The slider plate 450 includes channels 462 and 464 configured to slidably engage the slider guides 452 and 454, which are configured to be fixed to, for example, the edges 466 and 468 of the seat mount 402. The slider plate 450 can be made from various materials such as aluminum, steel, plastic, and/or any other suitable material and via any process(es) such as, for example, stamping and/or punching operations.

The locking member 456 is relatively elongated and includes a plurality of locking structures, raised portions or teeth 470 that engage at least one recess 459 of the locking lug 458 to prevent sliding movement of the slider plate 450 and, thus, any vehicle seat mounted thereto (i.e., a locked condition). A first end 472 of the locking member 456 is pivotally attached to the slider plate 450 via a fastener 473 and a second end 474 of the locking member 456 is coupled to the slider plate 450 via a return spring 476 to urge or springably bias the locking member 456 toward the locked condition.

As described above, the seat slider mechanism 114 is operated via the second flexible coupling 118. The second flexible coupling 118 is substantially similar to the cable assembly 312 of FIG. 3 and has a cable 478 and an outer sheath 480. The cable 478 has a first end 482 that is operatively coupled to the lever 208 (FIG. 2A) in a manner substantially similar to that shown in FIG. 3, and a second end 484 that is operatively coupled to the second end 474 of the locking member 456 opposite the side of the spring 476.

Referring to FIGS. 1A, 1B, 2A, 3 and 4, in operation, the example vehicle seat 100 described herein provides an unlocked condition in which the seating member 104 can be rotatably adjusted about, for example, an axis of rotation 486 (e.g., the longitudinal axis of a pedestal or seat mount) and the seating member 104 can be slidably adjusted about a fore and aft axis or direction 488 (e.g., the longitudinal axis of the slider plate 450) by an occupant of the vehicle seat 100 or other person, and a locked condition in which the seating member 104 is fixed (i.e., substantially immovable) about the axis of rotation 486 and the fore/aft axis or direction 488. As discussed above, the example vehicle seat 100 can include a seat rotation mechanism, a seat slider mechanism, and/or any other suitable adjustable mechanism(s) (e.g., a height adjustable mechanism to adjust the height of the vehicle seat 100).

In the illustrated example, the first lever 206 of the seat position control 108 is operatively coupled to the seat rotation mechanism 112 via the first cable assembly 116 and the second lever 208 of the control member 108 is operatively coupled to seat slider mechanism 114 via the second cable assembly 116. To unlock the seat rotation mechanism 112, the seat occupant or other person applies a force to (e.g., pulls, lifts, etc.) the first lever 206. As the lever 206 is lifted outward, the lever 206 rotates about the pivot 304 and pulls the cable 423 toward the lever 206, which applies a force via the cable 423 to the locking pin 412 to overcome the spring bias of spring 416 and urge the locking pin 412 away from the locked condition. When in the unlocked condition, the locking pin 412 is withdrawn from apertures 406, 408, and 410, thereby enabling the seat mount 402 and, thus, any seat or other apparatus mounted thereon to rotate relative to the base or pedestal 106. To return the seat rotation mechanism 112 to the locked condition, the seat occupant or other person releases the lever 206 and the springably biased locking pin 412 passes through the apertures 406, 408, and 410 to automatically return the seat rotational mechanism 112 to the locked condition.

Similarly, in an unlocked condition, the seat slider mechanism 114 enables the seating member 104 to slidably move in a fore and aft direction along the fore/aft axis or direction 488. To unlock the seat slider mechanism 114, the seat occupant or other person applies a force to (e.g., pulls, lifts, etc.) the second lever 208, which causes the second lever 208 to rotate about a pivot (e.g., the pivot 304). The lever 208 conveys a force via the second cable 478 to the locking member 456 to overcome the spring bias of the spring 476 and urge the locking member 456 to disengage from the locking lug 458. When in the unlocked condition, the teeth 470 of the locking member 456 disengage from the at least one recess 459 of the locking lug 458, thereby enabling the plate 450 and any seat mounted thereon (e.g., the seating member 104) to slidably move in the fore and aft direction relative to the fore/aft axis 488. To return the seat slider mechanism 114 to the locked condition, the seat occupant or other person releases the lever 208 and the teeth 470 of the springably biased locking member 456 engage at least one recess 459 of the locking lug 458 to automatically return the seat slider mechanism 114 to the locked condition.

Figure 5:
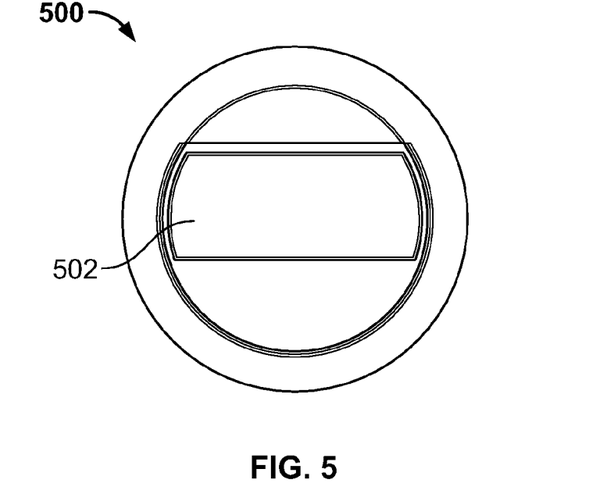
FIG. 5 depicts an example lever that can be used with the example control apparatus of FIG. 3.

FIG. 5 depicts another example seat position control apparatus 500 having a single lever 502 that can be used with the example vehicle seat 100 described herein. The control apparatus 500 may be operatively coupled to an adjustment mechanism (e.g., the adjustment mechanism 102) or multiple controls similar or identical to the control 500 can be coupled to the seating member 104 to operate respective adjustment mechanisms.

Figure 6A:
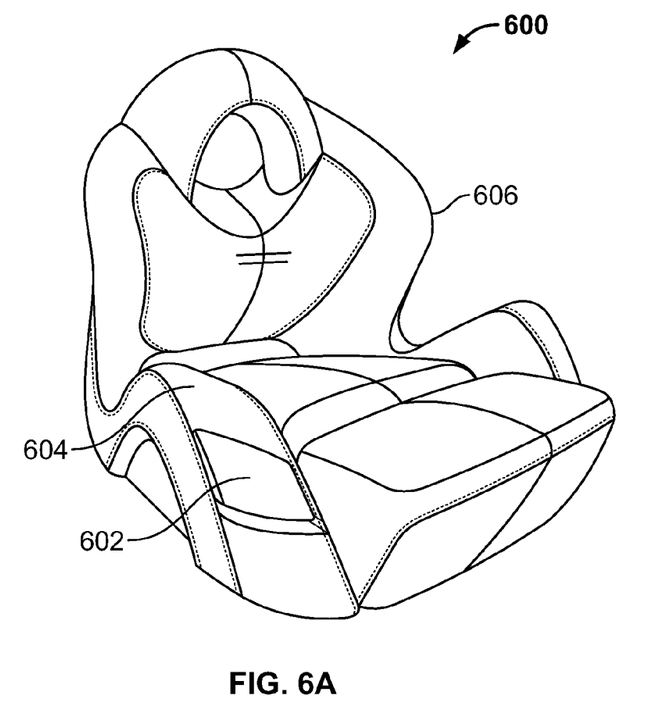
FIG. 6A depicts another example vehicle seat that may use the integral lever operated cables described herein.
Figure 6B:
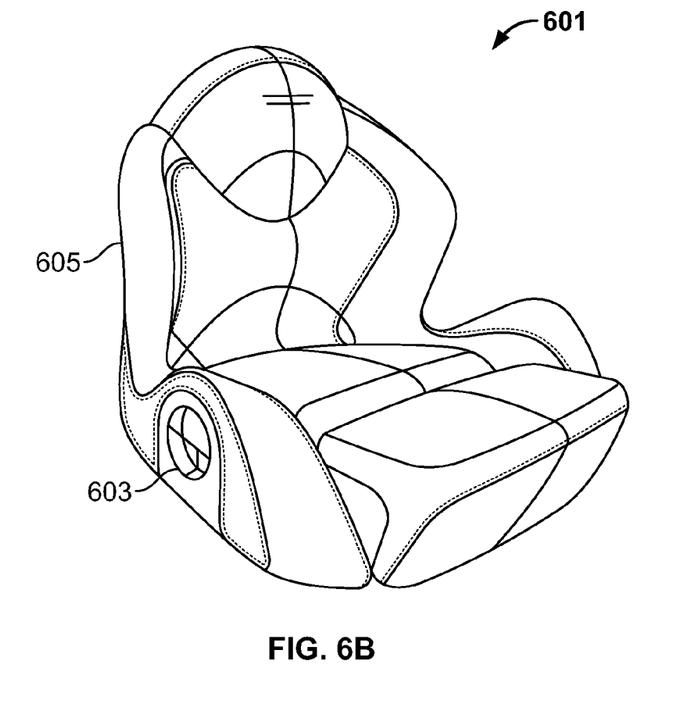
FIG. 6B depicts yet another example vehicle seat that may use the integral lever operated cables described herein.

FIGS. 6A and 6B illustrate other example vehicle seats that may use the integrated lever operated cables described herein. FIG. 6A depicts a vehicle seat 600 having a seat position control 602 integrally formed with a top frame or arm rest 604 of a seating member 606. FIG. 6B depicts a vehicle seat 601 having a control member 603 integrally formed with a seating member 605.

The example vehicle seats 100, 600 and 601 described herein advantageously provide a seat position control (e.g., the seat position control 108 of FIG. 1A) that can be integrally formed or coupled to a seating member. In this manner, the seat position control is easily and readily accessible to a seat occupant. The control can include a single actuator or lever to operate an adjustment mechanism via a cable, or can include multiple actuators or levers to operate respective adjustment mechanisms via respective cables. In addition, the cable or cables are substantially concealed or hidden within the vehicle seat to prevent damage (e.g., ripping, tearing, etc) of the cable due to the cable snagging on exposed items (e.g., screws, seat occupant, etc.) near the bottom of the vehicle seat and/or impairing operation of the levers.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A vehicle seat, comprising:
   a channel integrally formed within a frame of the vehicle seat;
   a seat position control integrally coupled to the frame of the vehicle seat adjacent the channel, wherein the seat position control includes a first control member and a second control member; and
   a cable assembly slidably movable within the channel and having a first end operatively coupled to a seat position adjustment mechanism and a second end operatively coupled to the seat position control, wherein the first control member is to control a rotational adjustment of the seat position adjustment mechanism and the second control member is to control a sliding adjustment of the seat position adjustment mechanism.

2. The vehicle seat as defined in claim 1, wherein the vehicle seat is a boat seat.

3. The vehicle seat as defined in claim 1, wherein the vehicle seat comprises the frame, a foam padding, and an upholstered outer surface.

4. The vehicle seat of claim 1, wherein the frame of the vehicle seat comprises a unitary piece or structure.

5. The vehicle seat as defined in claim 1, wherein the channel is integrally formed within the frame via roto-molding.

6. The vehicle seat as defined in claim 1, wherein the cable assembly comprises a cable and a sheath surrounding at least a portion of a length of the cable so that the cable is slidably movable therein.

7. The vehicle seat as defined in claim 1, wherein the channel comprises a track.

8. The vehicle seat as defined in claim 7, wherein the track comprises a tubular member.

9. The vehicle seat as defined in claim 1, wherein the seat position adjustment mechanism is configured to provide a locked condition and an unlocked condition.

10. The vehicle seat as defined in claim 1, wherein the seat position adjustment mechanism comprises a seat rotation mechanism to enable rotation of the vehicle seat relative to a pedestal.

11. The vehicle seat as defined in claim 1, wherein the seat position adjustment mechanism comprises a seat slider mechanism to enable fore and aft movement of the vehicle seat.

12. The vehicle seat of claim 1, wherein the frame of the vehicle seat provides substantial support to a seating surface of the vehicle seat.

13. The vehicle seat as defined in claim 1, wherein the seat position control is integrally formed within a side surface of the vehicle seat.

14. A vehicle seat, comprising:
   a groove integrally formed within a frame portion of the vehicle seat;
   a seat position control integrally formed with a surface of the vehicle seat and having a first lever and a second lever;
   a seat mount configured to receive the vehicle seat and having a first adjustment mechanism and a second adjustment mechanism, wherein each of the adjustment mechanisms provides a locked condition and an unlocked condition;
   a first substantially flexible coupling slidably moveable within the groove of the vehicle seat and having a first end and a second end, wherein the first end is operatively coupled to the first lever and the second end is operatively coupled to the first adjustment mechanism so that a manual force applied to the first lever urges the first adjustment mechanism toward the unlocked condition; and
   a second substantially flexible coupling within the groove of the vehicle seat and having a third end and a fourth end, wherein the third end is operatively coupled to the second lever and the fourth end is operatively coupled to the second adjustment mechanism so that a manual force applied to the second lever urges the second adjustment mechanism toward the unlocked condition.

15. The vehicle seat as defined in claim 14, wherein the first adjustment mechanism enables rotational adjustment of the vehicle seat.

16. The vehicle seat as defined in claim 14, wherein the second adjustment mechanism enables fore and aft adjustment of the vehicle seat.

17. The vehicle seat as defined in claim 14, wherein the first substantially flexible coupling comprises a cable assembly.

18. The vehicle seat as defined in claim 17, wherein the cable assembly comprises a cable and a sheath surrounding at least a portion of a length of the cable so that the cable is slidably movable therein.

19. The vehicle seat as defined in claim 14, wherein the first adjustment mechanism comprises a locking mechanism having a spring configured to bias the locking mechanism toward the locked condition.

20. The vehicle seat as defined in claim 14, wherein the vehicle seat is to be rotatably and slidably coupled to a pedestal.

* * * * *